(12) United States Patent
Jung et al.

(10) Patent No.: US 12,388,277 B2
(45) Date of Patent: Aug. 12, 2025

(54) METHOD AND APPARATUS FOR CHARGING BATTERY

(71) Applicant: Samsung Electronics Co., Ltd., Suwon-si (KR)

(72) Inventors: Daeryong Jung, Seoul (KR); Ju Wan Lim, Suwon-si (KR); Jinho Kim, Yongin-si (KR); Young Hun Sung, Hwaseong-si (KR); Duk Jin Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 400 days.

(21) Appl. No.: 17/238,605

(22) Filed: Apr. 23, 2021

(65) Prior Publication Data

US 2022/0115875 A1   Apr. 14, 2022

(30) Foreign Application Priority Data

Oct. 13, 2020   (KR) .......................... 10-2020-0132004

(51) Int. Cl.
*H02J 7/00*   (2006.01)

(52) U.S. Cl.
CPC .......... *H02J 7/005* (2020.01); *H02J 7/00712* (2020.01)

(58) Field of Classification Search
CPC ....... H02J 7/0069; H02J 7/005; H02J 7/00712
See application file for complete search history.

(56) References Cited

U.S. PATENT DOCUMENTS

| | | |
|---|---|---|
| 7,492,126 B2 | 2/2009 | Hogari et al. |
| 2012/0176096 A1* | 7/2012 | Mumelter ............... B60L 58/24 |
| | | 320/134 |
| 2013/0096858 A1 | 4/2013 | Amano et al. |
| 2016/0221465 A1 | 8/2016 | Kratzer et al. |
| 2016/0377686 A1 | 12/2016 | Uchida et al. |

(Continued)

FOREIGN PATENT DOCUMENTS

| | | |
|---|---|---|
| DE | 10 2016 107 528 A1 | 10/2017 |
| EP | 3 346 542 A1 | 7/2018 |

(Continued)

OTHER PUBLICATIONS

Sijia Liu, Jiuchun Jiang, Senior Member, IEEE, Wei Shi, Zeyu Ma, Le Yi Wang, Fellow, IEEE, and Hongyu Guo, "Butler-Volmer-Equation-Based Electrical Model for High-Power Lithium Titanate Batteries Used in Electric Vehicles", IEEE Trans. Ind. Electron., vol. 62, No. 12, pp. 7557-7567, Dec. 2015 (Year: 2015).*

(Continued)

*Primary Examiner* — Julian D Huffman
*Assistant Examiner* — Sadia Kousar
(74) *Attorney, Agent, or Firm* — NSIP Law

(57) ABSTRACT

Disclosed is a method and apparatus for charging a battery, the method includes a method of charging a battery, the method including determining an aging rate coefficient based on an internal state of the battery and an aging parameter related to aging of the battery, predicting an aging rate of the battery based on the aging rate coefficient, and determining whether to change a charging limit condition to charge the battery based on a comparison between the predicted aging rate and a target aging rate.

19 Claims, 10 Drawing Sheets

(56) References Cited

U.S. PATENT DOCUMENTS

| | | | |
|---|---|---|---|
| 2018/0358663 A1* | 12/2018 | Yonemoto | B60L 58/16 |
| 2019/0190277 A1* | 6/2019 | Jung | H01M 10/425 |
| 2021/0066945 A1 | 3/2021 | Jung et al. | |
| 2023/0094652 A1* | 3/2023 | Kosugi | H01M 10/48 |
| | | | 320/132 |

FOREIGN PATENT DOCUMENTS

| | | |
|---|---|---|
| JP | 6094598 B2 | 3/2017 |
| JP | 6226406 B2 | 11/2017 |
| JP | 2020-3497 A | 1/2020 |
| KR | 10-1610507 B1 | 4/2016 |
| KR | 10-2018-0057275 A | 5/2018 |
| KR | 10-1927538 B1 | 12/2018 |
| KR | 10-2019-0045736 A | 5/2019 |
| KR | 10-2019-0074123 A | 6/2019 |
| KR | 10-2020-0037592 A | 4/2020 |
| WO | WO-2017182497 A1 * | 10/2017 ......... B60L 11/1857 |

OTHER PUBLICATIONS

Extended European Search Report issued on Jan. 13, 2022 in counterpart European Patent Application No. 21187207.2 (8 pages in English).

* cited by examiner

METHOD AND APPARATUS FOR CHARGING BATTERY

CROSS-REFERENCE TO RELATED APPLICATIONS

This application claims the benefit under 35 USC § 119(a) of Korean Patent Application No. 10-2020-0132004 filed on Oct. 13, 2020, in the Korean Intellectual Property Office, the entire disclosure of which is incorporated herein by reference for all purposes.

BACKGROUND

Field

The following description relates to a method and apparatus for charging a battery.

2. DESCRIPTION OF RELATED ART

Batteries may be charged using various methods. For example, a constant current-constant voltage charging method charges a battery with constant currents, and charges the battery at a constant voltage when a voltage of the battery reaches a preset level. In another example, a varying current decay charging method charges a battery with high currents at a low state of charge (SOC), and gradually reduces the currents when the battery has attained a particular SOC. In another example, a multi-step charging method charges a battery with constant currents, and a pulse charging method charges a battery by repeatedly applying pulse currents at short time intervals.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of charging a battery, the method including determining an aging rate coefficient based on an internal state of the battery and an aging parameter related to aging of the battery, predicting an aging rate of the battery based on the aging rate coefficient, and determining whether to change a charging limit condition to charge the battery based on a comparison between the predicted aging rate and a target aging rate.

The determining of whether to change the charging limit condition may include determining to change the charging limit condition in response to the predicted aging rate exceeding the target aging rate.

The determining of whether to change the charging limit condition may be based on a degree by which the predicted aging rate exceeds the target aging rate.

The determining of whether to change the charging limit condition may include determining a new charging limit condition from the degree by which the predicted aging rate exceeds the target aging rate, based on an aging rate sensitivity analysis according to a change in the charging limit condition in each charging step.

The determining of whether to change the charging limit condition may include determining not to change the charging limit condition in response to the predicted aging rate being less than or equal to the target aging rate.

The determining of the aging rate coefficient may include calculating the aging rate coefficient from the internal state of the battery and the aging parameter, using a correspondence between an electrode balance shift by an irreversible loss of lithium ions and a side reaction amount determined based on the Butler-Volmer equation.

The predicting may include predicting the aging rate of the battery from the aging rate coefficient by modeling a tendency of a change in the aging rate coefficient according to the aging of the battery.

The internal state of the battery may include any one or any combination of a cathode lithium ion concentration distribution, an anode lithium ion concentration distribution, an electrolyte lithium ion concentration distribution, a cathode potential, and an anode potential of the battery.

The aging parameter may include any one or any combination of an electrode balance shift, a capacity for cathode active material, and an anode surface resistance of the battery.

The method may include charging the battery based on the charging limit condition or a new charging limit condition.

The charging limit condition may be configured to prevent aging of the battery based on limiting charging of the battery at each charging step by a target charging capacity during a target charging time.

The charging limit condition may include any one or any combination of an anode overpotential condition, a cathode overpotential condition, an anode surface lithium ion concentration condition, a cathode surface lithium ion concentration condition, a cell voltage condition, a state of charge (SOC) condition, and a maximum charging time condition for each charging step.

The internal state of the battery may be determined based on an electrochemical model to which the aging parameter of the battery may be applied.

In another general aspect, there is provided an apparatus for charging a battery, the apparatus including a processors configured to determine an aging rate coefficient based on an internal state of the battery and an aging parameter related to aging of the battery, predict an aging rate of the battery based on the aging rate coefficient, and determine whether to change a charging limit condition to charge the battery based on a comparison between the predicted aging rate and a target aging rate.

The processor may be configured to determine to change the charging limit condition in response to the predicted aging rate exceeding the target aging rate.

In another general aspect, there is provided a method of charging a battery, the method including determining an internal state of the battery based on an electrochemical model to which an aging parameter of the battery is applied, determining an aging rate coefficient based on the internal state and the aging parameter, predicting an aging rate of the battery based on modeling a change in the aging rate coefficient according to aging of the battery, comparing the predicted aging rate and a target aging rate, and charging the battery based on one of the charging limit condition and a new charging limit condition, in response to the comparison.

The target aging rate may be based on the state of health (SOH) of the battery and a cumulative power amount.

The charging limit condition and the new charging limit condition may be based on the charging limit condition lookup table (LUT).

Other features and aspects will be apparent from the following detailed description, the drawings, and the claims.

Figure 1:
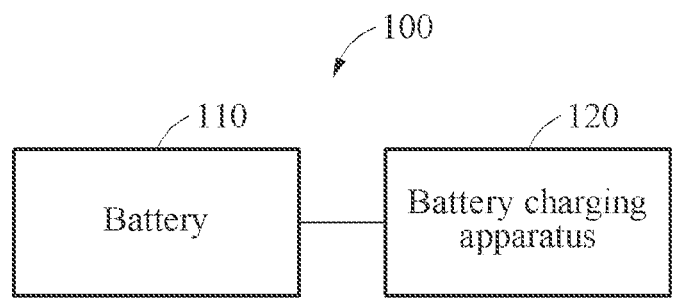
FIG. 1 illustrates an example of a battery system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as A, B, C, (a), (b), (c), "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

If the specification states that one component is "connected," "coupled," or "joined" to a second component, the first component may be directly "connected," "coupled," or "joined" to the second component, or a third component may be "connected," "coupled," or "joined" between the first component and the second component. However, if the specification states that a first component is "directly connected" or "directly joined" to a second component, a third component may not be "connected" or "joined" between the first component and the second component. Similar expressions, for example, "between" and "immediately between" and "adjacent to" and "immediately adjacent to," are also to be construed in this manner.

The terminology used herein is for the purpose of describing particular examples only and is not to be limiting of the examples. As used herein, the singular forms (for example, "a", "an", and "the") are intended to include the plural forms as well, unless the context clearly indicates otherwise. As used herein, the term "and/or" includes any one and any combination of any two or more of the associated listed items. As used herein, the terms "include," "comprise," "has," and "have" specify the presence of stated features, integers, steps, operations, elements, components, numbers, and/or a combination thereof, but do not preclude the presence or addition of one or more other features, integers, steps, operations, elements, components, numbers, and/or combinations thereof.

Hereinafter, examples will be described in detail with reference to the accompanying drawings. The following specific structural or functional descriptions are exemplary to merely describe the examples, and the scope of the examples is not limited to the descriptions provided in the present specification. Various changes and modifications can be made thereto by those of ordinary skill in the art. Like reference numerals in the drawings denote like elements, and a known function or configuration will be omitted herein.

FIG. 1 illustrates an example of a battery system.

Referring to FIG. 1, a battery system 100 includes a battery 110 and a battery charging apparatus 120.

The battery 110 may be one or more battery cells, battery modules, or battery packs. The battery 110 may include a capacitor, a secondary battery, or a lithium-ion battery for storing power when the batter is charged. A device employing the battery 110 may receive power from the battery 110.

The battery charging apparatus 120 charges the battery 110 using a battery model. For example, the battery charging apparatus 120 may fast charge the battery 110 in a multi-step charging manner that minimizes aging of the battery due to charging using an estimate of the internal state of the battery based on the battery model. In an example, the battery model may be an electrochemical model to which aging parameters of the battery 110 are applied to estimate state information of the battery 110 by modeling internal physical phenomena such as potential and ion concentration distribution of the battery 110. In addition, the internal state of the battery 110 may include any one or any combination of factors such as, for example, a cathode lithium ion concentration distribution, an anode lithium ion concentration distribution, an electrolyte lithium ion concentration distribution, a cathode potential, and an anode potential thereof. The aging parameters may include any one or any combination of factors such as, for example, an electrode balance shift, a capacity for cathode active material, and an anode surface resistance of the battery 110, which will be further described with reference to FIG. 3.

The battery charging apparatus 120 may divide the charging process into several charging steps and charge the battery 110 with a charging current corresponding to each charging step. For each of the charging steps, a charging limit condition for limiting charging of the battery 110 may be set. The charging limit condition may charge the battery 110 by a target charging capacity during a target charging time to prevent aging of the battery 110.

The charging limit condition may include internal state conditions for the respective charging steps. The internal state conditions may be defined by the electrochemical model based on at least one internal state that affects the aging of the battery 110. The internal state conditions may include any one or any combination of conditions such as, for example, an anode overpotential condition, a cathode overpotential condition, an anode surface lithium ion concentration condition, a cathode surface lithium ion concentration condition, a cell voltage condition, and a state of charge (SOC) condition for the battery 110.

Since the battery 110 may age when one of the internal state conditions is reached as the battery 110 is being charged, the battery charging apparatus may control the charging of the battery 110 using the internal state conditions. For example, if it is determined that the battery 110 ages when the anode overpotential of the battery 110 falls below 0.05 volts (V), the anode overpotential condition may be set based on 0.05 V. Aging conditions are conditions that cause aging when an internal state of the battery is reached. Here, the anode overpotential of 0.05 V may be an aging condition that causes aging when the anode overpotential of the battery 110 is reached. However, the internal state conditions are not limited to the examples above, and various expressions quantifying the internal states that affect the aging of the battery 110 may be employed.

Overpotential is a voltage drop caused by departing from the equilibrium potential associated with an intercalation/deintercalation reaction at each electrode of the battery 110. The lithium ion concentration described above is a concentration of lithium ions when the material in an active material of each electrode of the battery is lithium ions. Materials other than lithium ions may be employed as the material in the active material.

An SOC is a parameter indicating a charging state of the battery 110. The SOC indicates an amount of energy stored in the battery 110, and the amount may be expressed in percent (%), for example, indicated as 0% to 100%. For example, 0% may indicate a fully discharged state, and 100% may indicate a fully charged state. Such a metric may be variously modified in varied examples, for example, the percentage of the charge or discharge state may be defined depending on a design intention or an aspect of such examples. The SOC may be estimated or measured using various schemes.

The battery 110 may include two electrodes (cathode and anode) for intercalation/deintercalation of lithium ions, an electrolyte that is a medium through which lithium ions may move, a separator that physically separates the cathode and the anode to prevent direct flow of electrons but to allow ions to pass therethrough, and a collector that collects electrons generated by an electrochemical reaction or supplies electrons required for an electrochemical reaction. The cathode may include a cathode active material, and the anode may include an anode active material. For example, lithium cobalt oxide ($LiCoO_2$) may be used as the cathode active material, and graphite ($C_6$) may be used as the anode active material. Lithium ions move from the cathode to the anode while the battery 110 is charged, and lithium ions move from the anode to the cathode while the battery 110 is discharged. Thus, the concentration of lithium ions in the cathode active material and the concentration of lithium ions in the anode active material changes in response to charging and discharging.

The electrochemical model may be employed in various manners to express the internal state of the battery 110. For example, a single particle model (SPM) and various application models may be employed for the electrochemical model, and parameters defining the electrochemical model may be variously modified depending on a design intention.

The internal state conditions may be derived from the electrochemical model of the battery 110, or may be derived experimentally or empirically. The technique of defining the internal state conditions is not limited.

In addition, the charging limit condition includes maximum charging times for the respective charging steps. A maximum charging time may be a condition for a maximum time required to charge the battery 110 with a charging current of a corresponding charging step. As described above, the internal state conditions and/or the maximum charging times for the respective charging steps are charging conditions that are set to achieve two objectives. The first objective is to prevent aging of the battery 110, and the second objective is to charge the battery by a target charging capacity during a target charging time. The charging may be controlled based on an aging rate of the battery 110 as will be described later.

According to the charging control by the battery charging apparatus 120, a charging step of the battery 110 may be switched from a first charging step to a second charging step at a point in time when the internal state of the battery 110 reaches one of the internal state conditions or the charging time of the battery 110 reaches a maximum charging time while the battery 110 is charged with a first charging current in the first charging step. This process may be iteratively performed until the last charging step.

Repeated use of the battery 110 expedites aging, and the aging rate of the battery 110 may vary depending on the usage history of the battery 110. If the battery 110 is charged without consideration of the aging rate, it may be impossible to avoid the aging conditions during fast charging, which may lead to rapid aging and result in a reduction in the battery life. Accordingly, the battery charging apparatus 120 needs to adaptively perform charging control for the battery 110 based on the aging rate, which will be further described below with reference to the drawings.

Figure 2:
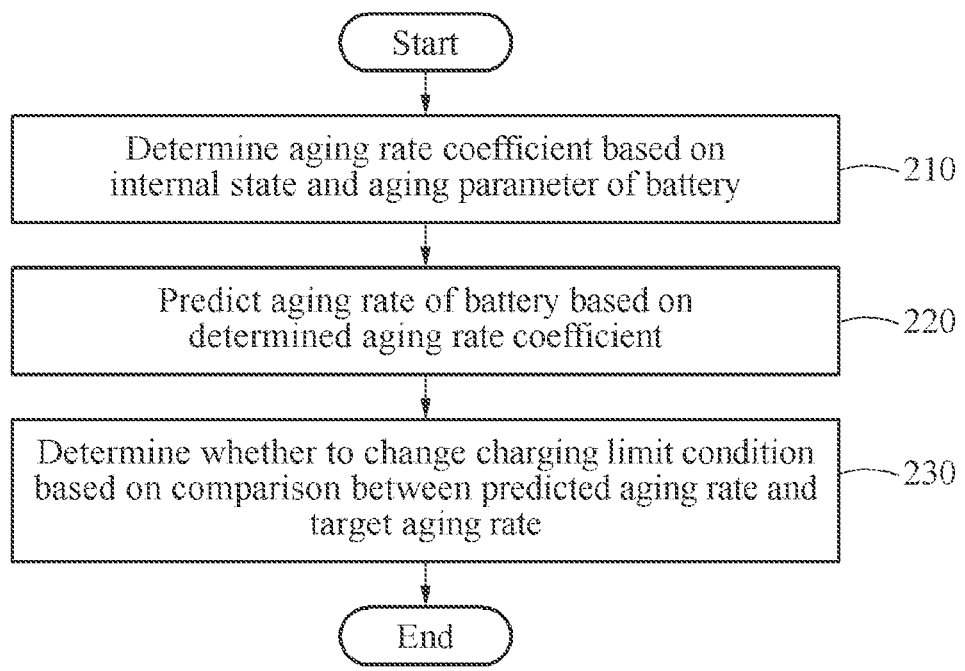
FIG. 2 illustrates an example of a battery charging method.

FIG. 2 illustrates an example of a battery charging method. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer, such as a processor, that perform the specified functions, or combinations of special purpose hardware and computer instructions. The battery charging method may be performed by a processor included in a battery charging apparatus. In addition to the description of FIG. 2 below, the descriptions of FIG. 1 are also applicable to FIG. 2, and are incorporated herein by reference. Thus, the above description may not be repeated here.

In operation 210, the battery charging apparatus determines an aging rate coefficient indicating an aging property of a battery based on an internal state of the battery and an aging parameter related to aging of the battery. In operation 220, the battery charging apparatus predicts an aging rate of the battery based on the determined aging rate coefficient. In operation 230, the battery charging apparatus determines whether to change a charging limit condition applied to charge the battery based on a comparison between the predicted aging rate and a target aging rate. The battery charging apparatus may charge the battery based on the charging limit condition or a new charging limit condition.

In this way, the battery charging apparatus may compare the predicted aging rate to the target aging rate, and control the process of charging the battery such that the predicted aging rate may not exceed the target aging rate by changing the charging limit condition applied to the battery charging if the predicted aging rate of the battery is higher than the target aging rate. By adaptively changing the charging control condition according to the aging rate that varies depending on the usage history of the battery or the state of the battery, the battery life is increased and the stability in fast charging may be secured.

Figure 3:
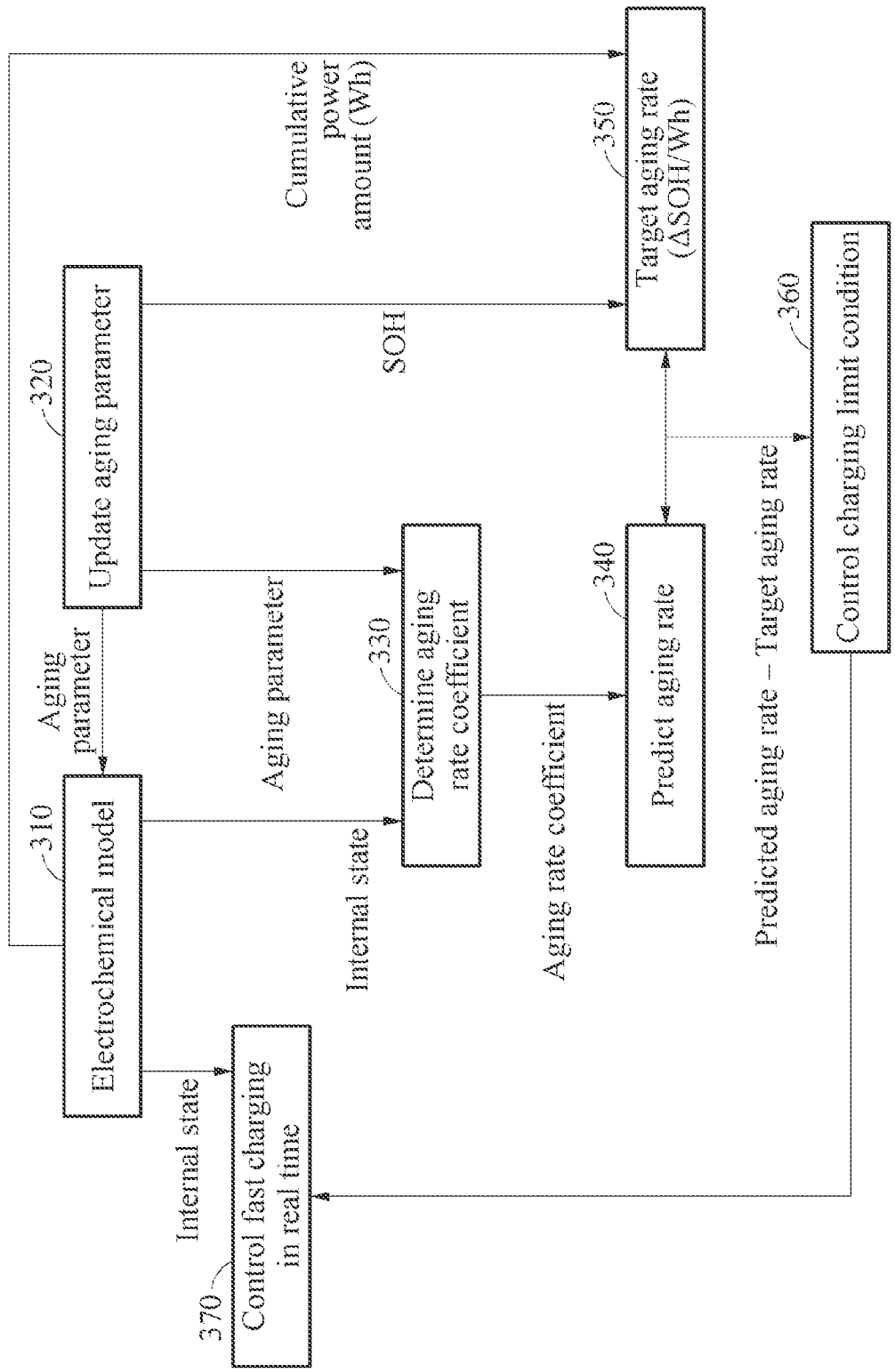
FIGS. 3 to 5 illustrate an example of controlling a charging limit condition.
Figure 4:
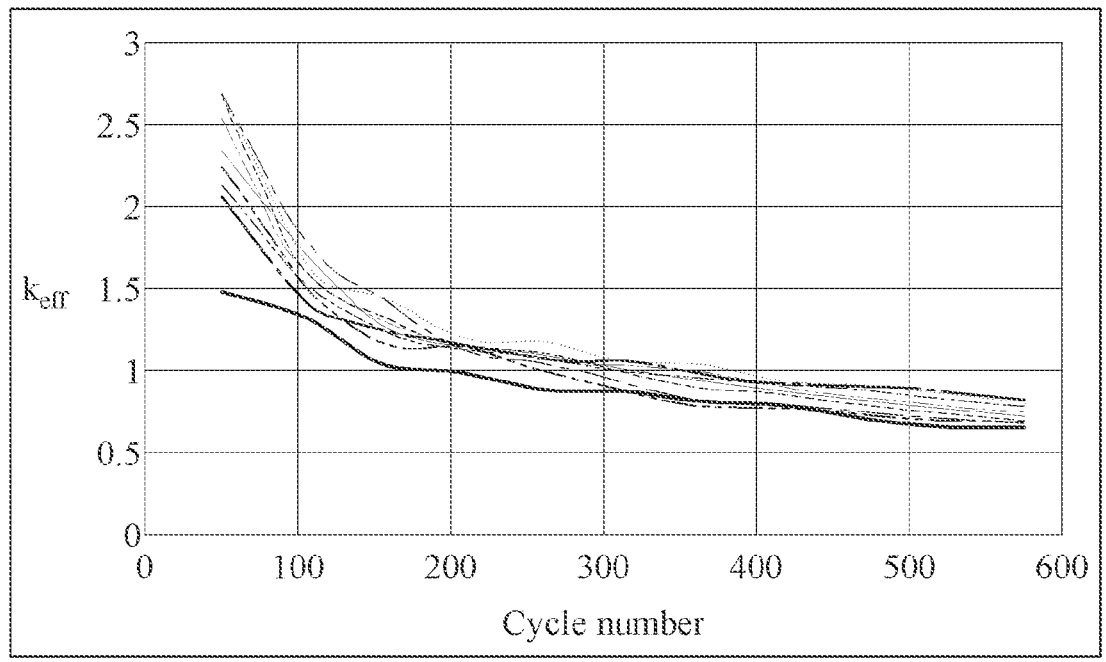
Figure 5:
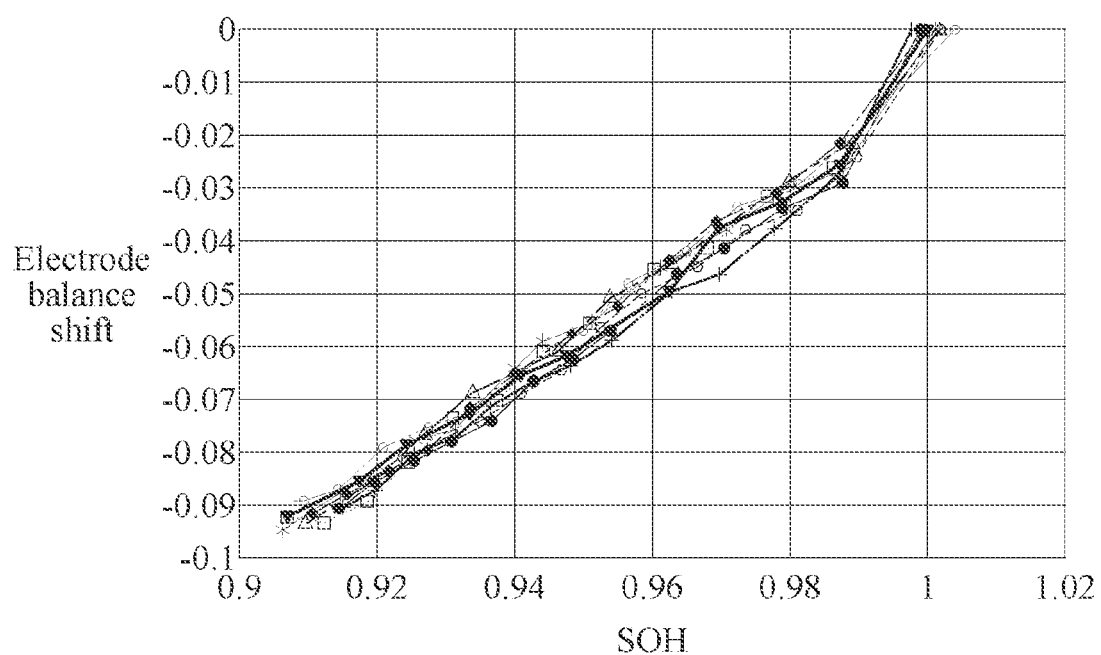

FIGS. 3 to 5 illustrate an example of controlling a charging limit condition.

Referring to FIG. 3, a process of controlling a charging limit condition based on an aging rate of a battery when charging a battery is shown. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer, such as a processor, that perform the specified functions, or combinations of special purpose hardware and computer instructions. In addition to the description of FIG. 3 below, the descriptions of FIGS. 1-2 are also applicable to FIG. 3, and are incorporated herein by reference. Thus, the above description may not be repeated here.

In operation 310, an electrochemical model may estimate an internal state of a battery to be charged. The estimated internal state may include any one or any combination of a cathode lithium ion concentration distribution, an anode lithium ion concentration distribution, an electrolyte lithium ion concentration distribution, a cathode potential, and an anode potential of the battery.

In operation 320, an aging parameter related to aging of the battery may be updated. The aging parameter may include any one or any combination of an electrode balance shift, a decrement in a capacity for cathode active material, and an anode surface resistance of the battery. However, the aging parameter may vary depending on an estimation algorithm, and is not limited to the above examples.

Electrode balance shift indicates the degree of change in the balance between the cathode and the anode and is caused by lithium ions chemically bonded to an anode by a side reaction and not being able to return to a cathode. The more severe the aging, the greater the shift in electrode balance may happen. The capacity for cathode active material indicates that active material capable of receiving lithium ions at the cathode decreases in response to aging. The more severe the aging, the smaller the capacity for cathode active material. The anode surface resistance is a resistance that is generated as solid electrolyte interphase layer is piled on the anode surface by an anode side reaction.

The aging parameter described above may be updated each battery cycle, or at certain times, or each time a condition is reached. In an example, the battery cycle, time, or condition may be predetermined. This update may be performed in various manners depending on a design intention or an aspect of such examples.

By reflecting the changes in the aging parameters described above in the electrochemical model, the internal state of the battery that is aged may be estimated with high accuracy.

In operation 330, an aging rate coefficient indicating an aging property of the battery may be determined based on the internal state of the battery estimated by the electrochemical model and the updated aging parameter.

For example, the aging rate coefficient may be calculated from the internal state of the battery and the aging parameter, using a correspondence between an electrode balance shift by an irreversible loss of lithium ions and a side reaction amount that is determined based on the Butler-Volmer equation.

The Butler-Volmer equation obtains the amount of lithium ions consumed by the anode side reaction (that is, the anode side reaction amount) and may be expressed by Equation 1.

$$j_{side}^{Li} = a_s i_{0,side}\left[\exp\left(\frac{\alpha_{a,side} n_{side} F}{RT}\eta_{side}\right) - \exp\left(-\frac{\alpha_{c,side} n_{side} F}{RT}\eta_{side}\right)\right] \quad \text{[Equation 1]}$$

In Equation 1, $j_{side}^{Li}$ denotes an electrode current density related to the consumption of lithium ions by the anode side reaction. By integrating $j_{side}^{Li}$ with respect to time, the amount of lithium ions consumed by the anode side reaction may be obtained. $a_s$ denotes an active surface area of the anode, and $i_{0,side}$ denotes an exchange current density for the anode side reaction. $\alpha_{a,side}$ denotes an anodic charge transfer coefficient, and $\alpha_{c,side}$ denotes a cathodic charge transfer coefficient, and each may have a value of 0.5, for example. $n_{side}$ denotes the number of molecules involved in the anode side reaction, F denotes the Faraday constant, R denotes an ideal gas constant, and T denotes the temperature. $\eta_{side}$ denotes an anode overpotential for the side reaction and may be expressed by Equation 2.

$$\eta_{side} = \phi_s - \phi_e - U_{eq,side} - \frac{R_{SEI,total}}{a_{s,side}} j_{total}^{Li} \quad \text{[Equation 2]}$$

In Equation 2, $\phi_s$ denotes a potential of a solid, and $\phi_e$ denotes a potential of an electrolyte. $U_{eq,side}$ denotes the equilibrium potential for the side reaction and may be set to 0.4 V, for example. $R_{SEI,total}$ denotes the resistance by the solid electrolyte interphase ("SEI") layer formed on the anode surface, $a_{s,side}$ denotes the active surface area of the anode, and $j_{total}^{Li}$ denotes the electrode current density related to all lithium ions.

The exchange current density $i_{0,side}$ described above may be expressed by Equation 3.

$$i_{0,side} = k_{side}\sqrt{c_{s,surf} c_{EC,Rs}} \quad \text{[Equation 3]}$$

In Equation 3, $k_{side}$ denotes a kinetic rate constant for the side reaction, $c_{s,surf}$ denotes the lithium ion concentration on the electrode (for example, anode) surface, and $c_{EC,Rs}$ denotes the electrolyte concentration on the electrode surface.

Based on the remaining terms excluding $c_{s,surf}$ in the right term of Equation 3, the aging rate coefficient $k_{eff}$ may be expressed by Equation 4.

$$k_{eff} = k_{side}\sqrt{c_{EC,Rs}} \quad \text{[Equation 4]}$$

Referring to Equation 1 again, $j_{side}^{Li}$ in the left term of Equation 1 may be obtained from the previously updated electrode balance shift based on the correspondence between electrode balance shifts (for example, proportional relationship). In addition, since the remaining terms excluding the aging rate coefficient $k_{eff}$ in the right term of Equation 1 are constants or correspond to internal states derived through the electrochemical model, the aging rate coefficient $k_{eff}$ may be readily calculated. FIG. 4 shows a tendency of the aging rate coefficient $k_{eff}$ decreasing as the number of cycles of the battery cell increases, i.e., as the battery ages. In an example, the aging rate coefficient $k_{eff}$ may indicate a property (for example, an aging rate) of aging of the battery.

In an example, the process of determining the aging rate coefficient may be performed at various frequencies. For example, the aging rate coefficient may be determined each cycle in which charging is performed, or may be determined in a predetermined cycle. A time when the process of determining the aging rate coefficient is performed is not limited, and the aging rate coefficient may be determined at various times.

In operation 340, an aging rate of the battery may be predicted based on the determined aging rate coefficient. For example, the aging rate of the battery may be predicted from the determined aging rate coefficient by modeling a tendency of a change in the aging rate coefficient according to the aging of the battery. FIG. 5 shows that an electrode balance shift having a correspondence with the aging rate coefficient has a high correlation with a state of health (SOH). By modeling the tendency of a change in the aging rate coefficient based on this characteristic, the aging rate of the battery may be predicted based on the aging rate coefficient determined as described above.

The SOH is a parameter quantitatively indicating a change in the life characteristic of a battery caused by aging, and may indicate a degree of degradation in the life or capacity of the battery. Various schemes may be employed to estimate or measure an SOH.

The example of predicting the aging rate of the battery based on the current aging rate coefficient is described above. However, in another example, even a future aging rate of the battery may be considered in addition to the current aging rate coefficient by predicting a future aging rate coefficient and utilized for controlling a charging limit condition, which will be described later.

In operation 350, a target aging rate may be calculated based on the SOH of the battery and a cumulative power amount (watt-hour (Wh)). In an example, the target aging rate may be set in advance by a user or a designer prior to performing battery charging.

In operation 360, a charging limit condition to be applied to charging of the battery may be controlled based on a comparison between the predicted aging rate and the target aging rate. For example, if the predicted aging rate exceeds the target aging rate, it may be determined that the battery is aging rapidly, and the current charging limit condition of the battery may be changed to a charging limit condition that may reduce the aging rate. In an example, the current aging rate of the battery may be predicted based on the degree by which the predicted aging rate exceeds the target aging rate, and a degree of controlling the aging rate may be determined based on the predicted aging rate. If the degree by which the predicted aging rate exceeds the target aging rate is large, the current charging limit condition may be changed to a charging limit condition that may further reduce the aging rate. If the degree by which the predicted aging rate exceeds the target aging rate is not large, the current charging limit condition may be changed to a charging limit condition that slightly reduces the aging rate.

For example, the controlled charging limit condition may be an anode potential condition. Based on the analysis of aging rate sensitivity according to a change in anode potential at each charging step, a charging limit condition to which the current charging limit condition is to be changed may be determined from the degree by which the predicted aging rate exceeds the target aging rate.

In another example, if the predicted aging rate is less than the target aging rate, it may be determined that the aging rate of the battery is an acceptable level that is lower than a preset target aging rate, and the current charging limit condition of the battery may be maintained without being changed.

In operation 370, the battery may be charged according to the charging limit condition that is controlled based on the predicted aging rate. As described above, by adaptively controlling the charging limit condition by predicting the aging rate of the battery, it is possible to effectively prevent a reduction in the battery life caused by fast charging of the battery and to guarantee stability in battery charging.

Figure 6:
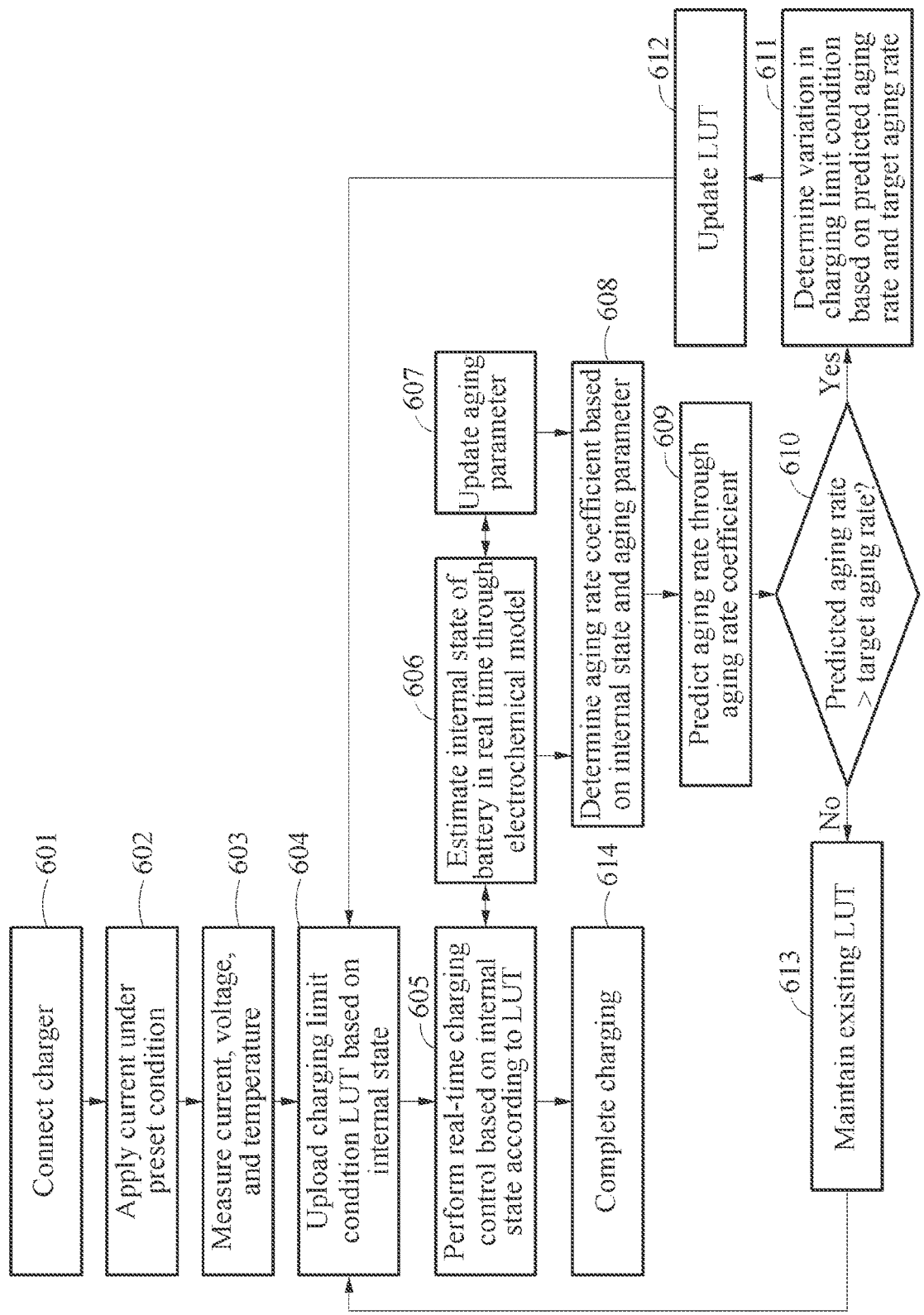
FIG. 6 illustrates an example of charging a battery.

FIG. 6 illustrates an example of a method of charging a battery. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer, such as a processor, that perform the specified functions, or combinations of special purpose hardware and computer instructions. In addition to the description of FIG. 6 below, the descriptions of FIGS. 1-5 are also applicable to FIG. 6, and are incorporated herein by reference. Thus, the above description may not be repeated here.

Referring to FIG. 6, in operation 601, a battery may be connected to a charger. In operation 602, a battery charging apparatus may apply a charging current to the battery under a condition. In an example the condition is preset, and the applied charging current is a current for estimating a state of the battery. In operation 603, the battery charging apparatus may estimate or measure a current, voltage, and temperature of the battery. Various schemes may be employed to estimate or measure the current, voltage, and temperature of the battery. In operation 604, the battery charging apparatus may upload a charging limit condition lookup table (LUT) based on the internal state of the battery. The charging limit condition LUT may include charging currents and charging limit conditions including maximum charging times and/or internal state conditions for respective charging steps. In operation 605, the battery charging apparatus may perform real-time charging control based on the internal state of the battery according to the charging limit condition LUT.

In operation 606, the battery charging apparatus may estimate the internal state of the battery based on an electrochemical model. The estimated internal state may be utilized for operation 605 of performing real-time charging control, operation 607 of updating an aging parameter, and operation 608 of determining an aging rate coefficient. In operation 608, the battery charging apparatus may determine the aging rate coefficient of the battery based on the internal state and the aging parameter. In operation 609, the battery charging apparatus may predict the aging rate of the battery through the aging rate coefficient. In operation 610, the battery charging apparatus may determine whether the predicted aging rate exceeds a target aging rate. If the predicted aging rate exceeds the target aging rate, in operation 611, the battery charging apparatus may determine a variation in the charging limit condition based on the difference between the predicted aging rate and the target aging rate, In operation 612, the battery charging apparatus may update the charging limit condition LUT based on the determined variation.

When the charging limit condition LUT is updated, in operation 604, the battery charging apparatus may upload the updated charging limit condition LUT. In operation 605, the battery charging apparatus may perform charging control according to the updated charging limit condition LUT. In an example, if the predicted aging rate does not exceed the target aging rate, in operation 613, the battery charging apparatus may maintain the existing charging limit condition LUT without changes. If a charging completion condition according to the charging limit condition LUT is reached, in operation 614, the multi-step charging control of the battery charging apparatus may complete the battery charging.

Figure 7:
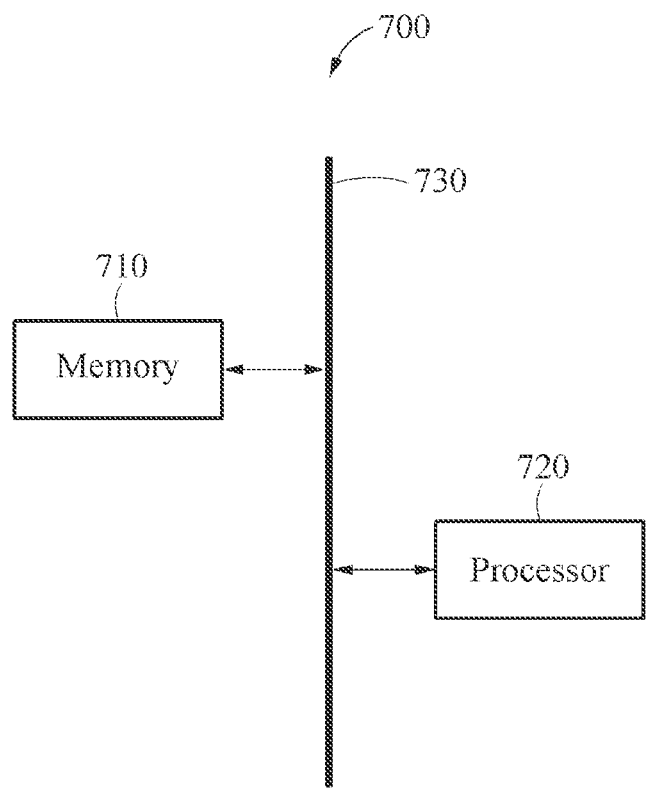
FIG. 7 illustrates an example of an apparatus for charging a battery.

FIG. 7 illustrates an example of an apparatus for charging a battery.

Referring to FIG. 7, a battery charging apparatus 700 includes a memory 710 and a processor 720. The memory 710 and the processor 720 may communicate with each other through a bus 730, a network on a chip (NoC), peripheral component interconnect express (PCIe), or the like.

The memory 710 may include computer-readable instructions. The processor 720 may perform the operations described above when the instructions stored in the memory 710 are executed by the processor 720. The memory 710 may be a volatile memory or a non-volatile memory.

In an example, the volatile memory device may be, for example, a dynamic random-access memory (DRAM), a static RAM (SRAM), a thyristor RAM (T-RAM), a zero-capacitor RAM (Z-RAM), or a twin-transistor RAM (TTRAM).

In an example, the nonvolatile memory device may be, for example, an electrically erasable programmable read-only memory (EEPROM), a flash memory, a magnetic RAM (MRAM), a spin-transfer torque (STT) MRAM (STT-MRAM), a conductive bridging RAM (CBRAM), a ferro-electric RAM (FeRAM), a phase-change RAM (PRAM), a resistive RAM (RRAM), a nanotube RRAM, a polymer RAM (PoRAM), a nano-floating gate memory (NFGM), a holographic memory, a molecular electronic memory device, or an insulator resistance change memory. Further description regarding the memory 710 is provided below.

The processor 720 may be a device that executes the instructions or programs or that controls the battery charging apparatus 700. The processor 720 may process data stored in the memory 710. The processor 720 may be a hardware-implemented apparatus having a circuit that is physically structured to execute desired operations. For example, the desired operations may be implemented by execution of code or instructions. The hardware-implemented apparatus may include, for example, a microprocessor, a central processing unit (CPU), single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, a processor core, a multi-core processor, and a multiprocessor, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner. Further description of the processor 720 is given below.

The processor 720 determines an aging rate coefficient indicating an aging property of a battery based on an internal state of the battery and an aging parameter related to aging of the battery, predicts an aging rate of the battery based on the determined aging rate coefficient, and determines whether to change a charging limit condition applied to charging of the battery based on a comparison between the predicted aging rate and a target aging rate.

The battery charging apparatus 700 may be applied to a battery management system (BMS) including a function of estimating an SOC of a capacitor, a secondary battery, or a lithium ion battery, an electronic device using a capacitor, a secondary battery, or a lithium ion battery, a means of transportation, or a power storing device that is based on a capacitor, a secondary battery, or a lithium ion battery. Further, the battery charging apparatus 700 may be applied to various computing devices such as a smart phone, a tablet, a laptop and a personal computer, various wearable devices such as a smart watch, smart glasses and smart clothes, various home appliances such as a smart speaker, a smart TV and a smart refrigerator, a smart car, a smart kiosk, an Internet of things (IoT) device, a walking assist device (WAD), a drone, and a robot.

In addition, the battery charging apparatus 700 may process the operations described above.

Figure 8:
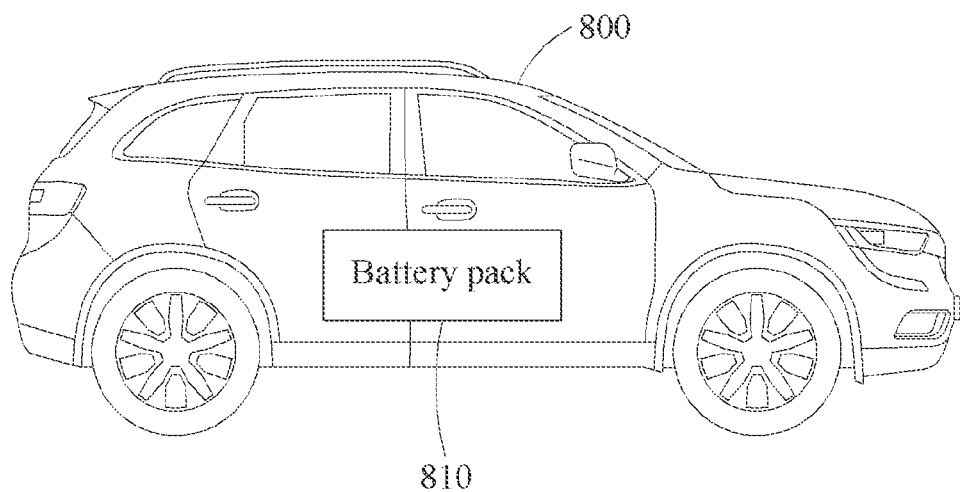
FIG. 8 illustrates an example of a vehicle.

FIG. 8 illustrates an example of a vehicle.

Referring to FIG. 8, a vehicle 800 includes a battery pack 810. The vehicle 800 may use the battery pack 810 as a power source. The vehicle 800 may be, for example, an electric vehicle or a hybrid vehicle.

The battery pack 810 includes a BMS and battery cells (or battery modules). The BMS may monitor whether the battery pack 810 shows an abnormality, and prevent over-charging or over-discharging of the battery pack 810. Further, the BMS may perform thermal control for the battery pack 810 when the temperature of the battery pack 810 exceeds a first temperature (for example, 40° C.) or is less than a second temperature (for example, −10° C.). In addition, the BMS may perform cell balancing so that the battery cells in the battery pack 810 have balanced charging states.

In an example, the vehicle 800 may include a battery charging apparatus. The battery charging apparatus may charge the battery pack 810 (or the battery cells in the battery pack 810) by adaptively controlling charging limit conditions by predicting an aging rate of the battery pack 810 (or the battery cells in the battery pack 810).

The description provided with reference to FIGS. 1 through 7 also applies to the description of FIG. 8, and thus a detailed description will be omitted for conciseness.

Figure 9:
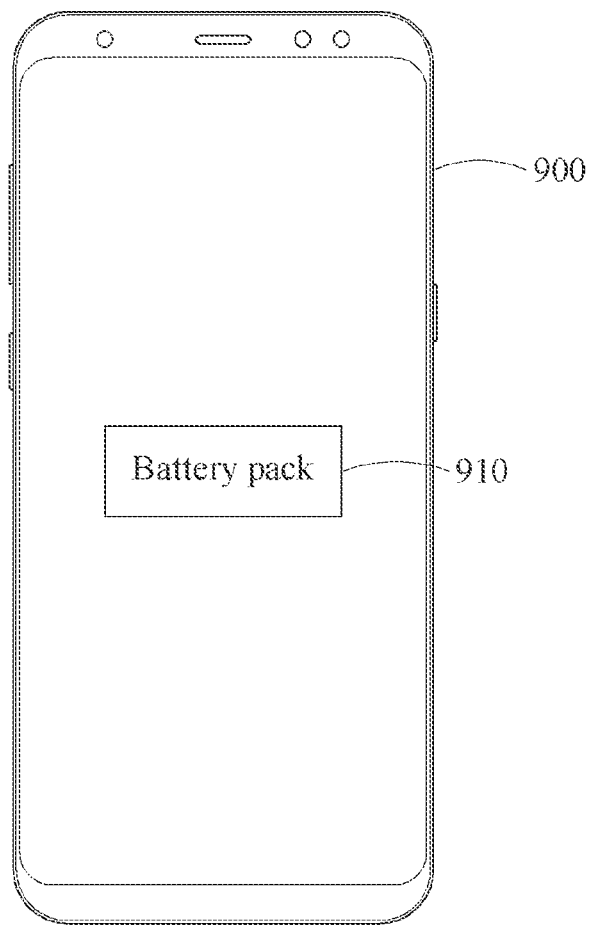
FIG. 9 illustrates an example of a mobile device.

FIG. 9 illustrates an example of a mobile device.

Referring to FIG. 9, a mobile device 900 includes a battery pack 910. The mobile device 900 may be a device that uses the battery pack 910 as a power source. The mobile device 900 may be a portable terminal, for example, a smart phone. The battery pack 910 includes a BMS and battery cells (or battery modules).

In an example, the mobile device 900 may include a battery charging apparatus. The battery charging apparatus may charge the battery pack 910 (or the battery cells in the battery pack 910) by adaptively controlling charging limit conditions by predicting an aging rate of the battery pack 910 (or the battery cells in the battery pack 910).

The description provided with reference to FIGS. 1 through 8 also applies to the description of FIG. 9, and thus a detailed description will be omitted for conciseness.

Figure 10:
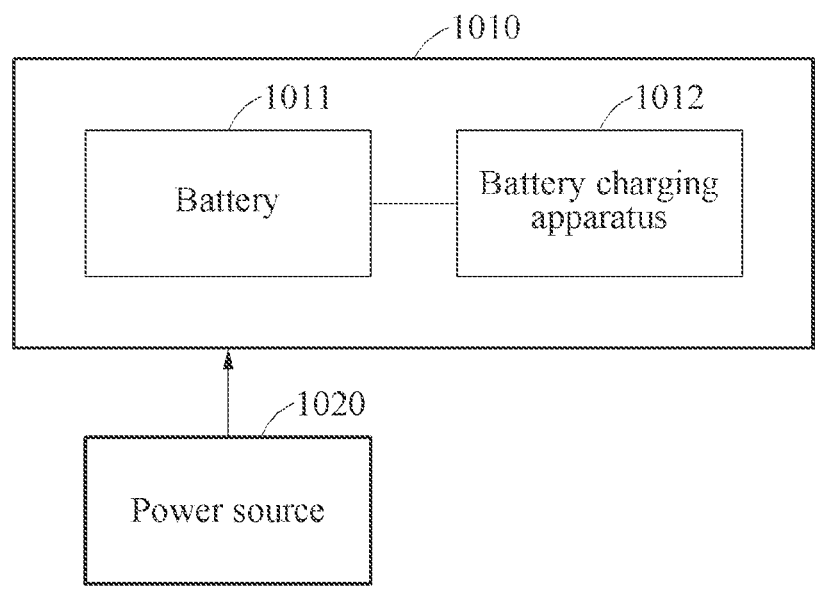
FIG. 10 illustrates an example of a terminal.

FIG. 10 illustrates an example of a terminal.

Referring to FIG. 10, a terminal 1010 includes a battery 1011 and a battery charging apparatus 1012. The terminal 1010 may be a mobile terminal such as a smart phone, a laptop, a tablet PC, or a wearable device, but is not limited thereto. The battery charging apparatus 1012 may be in the form of an integrated circuit (IC), but is not limited thereto. The battery charging apparatus 1012 may receive power from a power source 1020 in a wired or wireless manner and charge the battery 1011 using the power. The battery charging apparatus 1012 may charge the battery 1011 by adaptively controlling charging limit conditions by predicting an aging rate of the battery 1011.

The description provided with reference to FIGS. 1 through 9 also applies to the description of FIG. 10, and thus a detailed description will be omitted for conciseness.

The apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods illustrated in FIGS. 2-6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In an example, the instructions or software includes at least one of an applet, a dynamic link library (DLL), middleware, firmware, a device driver, an application program storing the method of charging a battery. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque(STT)-MRAM, static random-access memory (SRAM), thyristor RAM (T-RAM), zero capacitor RAM (Z-RAM), twin transistor RAM (TTRAM), conductive bridging RAM(CBRAM), ferroelectric RAM (FeRAM), phase change RAM (PRAM), resistive RAM(RRAM), nanotube RRAM, polymer RAM (PoRAM), nano floating gate Memory(NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A method of charging a battery, the method comprising:
   calculating an aging rate coefficient based on an internal state of the battery and an aging parameter related to aging of the battery;
   generating an aging rate of the battery based on the calculated aging rate coefficient; and
   controlling a charging of the battery based on a result of a selective, dependent on the generated aging rate and a target aging rate, updating of a charging limit condition including conditions of the internal state of the battery for respective charging steps,
   wherein the internal state of the battery comprises any one or any combination of a cathode lithium ion concentration distribution, an anode lithium ion concentration distribution, and an electrolyte lithium ion concentration distribution of the battery,
   wherein the determining of the aging rate coefficient comprises calculating the aging rate coefficient from the internal state of the battery and the aging parameter, using a correspondence between an electrode balance shift by an irreversible loss of lithium ions and a side reaction amount determined based on the Butler-Volmer equation.

2. The method of claim 1, wherein the selective updating of the charging limit condition comprises selecting to change the charging limit condition in response to the generated aging rate exceeding the target aging rate.

3. The method of claim 1, wherein the selective updating of the charging limit condition includes selectively updating the charging limit condition based on a degree by which the generated aging rate exceeds the target aging rate.

4. The method of claim 3, wherein the selective updating of the charging limit condition comprises updating the charging limit condition to be a new charging limit condition determined from the degree by which the generated aging rate exceeds the target aging rate, based on an aging rate sensitivity analysis according to a change in the charging limit condition in each charging step.

5. The method of claim 1, wherein the selective updating of the charging limit condition comprises selecting to not update the charging limit condition in response to the generated aging rate being less than or equal to the target aging rate and controlling the charging of the battery based on the charging limit condition.

6. The method of claim 1, wherein the generating of the aging rate comprises predicting the aging rate of the battery from the aging rate coefficient by modeling a tendency of a change in the aging rate coefficient according to the aging of the battery.

7. The method of claim 1, wherein the internal state of the battery comprises any one or any combination of a cathode potential, and an anode potential of the battery.

8. The method of claim 1, wherein the aging parameter comprises any one or any combination of an electrode balance shift, a capacity for cathode active material, and an anode surface resistance of the battery.

9. The method of claim 1, further comprising:
   charging the battery based on a new charging limit condition as the result of the selective updating.

10. The method of claim 1, wherein the charging limit condition is configured to prevent aging of the battery based on limiting charging of the battery at each charging step by a target charging capacity during a target charging time.

11. The method of claim 1, wherein the charging limit condition comprises any one or any combination of an anode overpotential condition, a cathode overpotential condition, an anode surface lithium ion concentration condition, a cathode surface lithium ion concentration condition, a cell voltage condition, a state of charge (SOC) condition, and a maximum charging time condition for each charging step.

12. The method of claim 1, wherein the internal state of the battery is determined based on an electrochemical model to which the aging parameter of the battery is applied.

13. A non-transitory computer-readable storage medium storing instructions that, when executed by a processor, cause the processor to perform the method of claim 1.

14. An apparatus for charging a battery, the apparatus comprising:
   one or more processors configured to:
   calculating an aging rate coefficient based on an internal state of the battery and an aging parameter related to aging of the battery,
   predict an aging rate of the battery based on the calculated aging rate coefficient, and
   control a charging of the battery based on a result of a selective, dependent on the generated aging rate and a target aging rate, updating of a charging limit condition,
   wherein the internal state of the battery comprises any one or any combination of a cathode lithium ion concentration distribution, an anode lithium ion concentration distribution, and an electrolyte lithium ion concentration distribution of the battery,
   wherein the determining of the aging rate coefficient comprises calculating the aging rate coefficient from the internal state of the battery and the aging parameter, using a correspondence between an electrode balance shift by an irreversible loss of lithium ions and a side reaction amount determined based on the Butler-Volmer equation.

15. The apparatus of claim 14, wherein the processor is further configured to select to change the charging limit condition in response to the predicted aging rate exceeding the target aging rate.

16. A method of charging a battery, the method comprising:
- determining an internal state of the battery based on an electrochemical model to which an aging parameter of the battery is applied;
- calculating an aging rate coefficient based on the internal state and the aging parameter;
- predicting an aging rate of the battery based on modeling a change in the calculated aging rate coefficient according to aging of the battery; and
- charging the battery based on a selecting, in response to a comparison result of the predicted aging rate and a target aging rate, one of the charging limit condition and a new charging limit condition,
- wherein the internal state of the battery comprises any one or any combination of a cathode lithium ion concentration distribution, an anode lithium ion concentration distribution, and an electrolyte lithium ion concentration distribution of the battery,
- wherein the determining of the aging rate coefficient comprises calculating the aging rate coefficient from the internal state of the battery and the aging parameter, using a correspondence between an electrode balance shift by an irreversible loss of lithium ions and a side reaction amount determined based on the Butler-Volmer equation.

17. The method of claim 16, wherein the target aging rate is based on the state of health (SOH) of the battery and a cumulative power amount.

18. The method of claim 16, wherein the charging limit condition and the new charging limit condition are based on a charging limit condition lookup table (LUT).

19. The method of claim 18, further comprising:
- updating the charging limit condition lookup table (LUT) based on a difference between the predicted aging rate and the target aging rate.

\* \* \* \* \*